(12) United States Patent
Byun et al.

(10) Patent No.: US 7,190,549 B2
(45) Date of Patent: Mar. 13, 2007

(54) SLIM SPINDLE MOTOR AND MICRO-DRIVE APPARATUS COMPRISING THE SAME

(75) Inventors: Yong-kyu Byun, Kyungki-do (KR);
Min-pyo Hong, Kyungki-do (KR);
Woo-sup Han, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 352 days.

(21) Appl. No.: 10/444,960

(22) Filed: May 27, 2003

(65) Prior Publication Data

US 2004/0090701 A1    May 13, 2004

(30) Foreign Application Priority Data

Nov. 12, 2002  (KR) ............... 10-2002-0070063

(51) Int. Cl.
*G11B 17/02*   (2006.01)
*H02K 21/14*   (2006.01)

(52) U.S. Cl. .................. 360/99.08; 360/98.07; 310/67 R; 310/90; 310/156.26

(58) Field of Classification Search ......... 360/99.08, 360/99.04, 99.05, 99.12, 98.08, 98.07; 310/67 R, 310/90, 156.26
See application file for complete search history.

(56) References Cited

U.S. PATENT DOCUMENTS 4,745,312 A * 5/1988 Nagasaka .............. 310/49 R
4,949,000 A * 8/1990 Petersen ................ 310/179
6,344,946 B1 * 2/2002 Papst .................... 360/99.08
6,437,939 B1 * 8/2002 Smith .................... 360/97.01
6,594,111 B1 * 7/2003 Oveyssi et al. ......... 360/99.08

(Continued)

FOREIGN PATENT DOCUMENTS

DE    10064245 A1 *  7/2002

(Continued)

OTHER PUBLICATIONS

Hartmann, "Stator for electrical machine has grooves accommodating coils, in which groove end is curved to match end curvature of coil," Jul. 11, 2002, Derwent Information Ltd, Publication No. DE 10064245 A1, Derwent—ACC-No. 2002-584644, Abstract.*

(Continued)

*Primary Examiner*—William J Klimowicz
(74) *Attorney, Agent, or Firm*—Buchanan Ingersoll & Rooney PC (57) ABSTRACT

A slim spindle motor and a micro-drive apparatus including the slim spindle motor are provided. In the spindle motor, a hub is rotatably mounted on a base plate by ball bearings. The hub is used to seat a disk thereon. A ring-shaped magnet is engaged to the outer boundary of the hub. A stator is formed by arranging a plurality of yokes in a round shape around the outer boundary of the ring-shaped magnet. The yokes include cores having curved ends to reduce the central axis offset between the yokes and the ring-shaped magnet. Most of the yokes include coils that cover the cores. Since the central axes of the yokes in the stator are made collinear with the central axis of the ring-shaped magnet, the slim spindle motor can operate stably.

10 Claims, 5 Drawing Sheets

U.S. PATENT DOCUMENTS

2002/0074895 A1* 6/2002 Klode ..................... 310/261
2002/0185929 A1* 12/2002 Jang et al. ................ 310/210

FOREIGN PATENT DOCUMENTS

| JP | 58063067 A | * | 4/1983 |
| JP | 59061460 | | 4/1984 |
| JP | 62214508 A | * | 9/1987 |
| JP | 5038115 | | 2/1993 |
| JP | 06319246 A | * | 11/1994 |
| JP | 11032466 | | 2/1999 |
| JP | 11041891 | | 2/1999 |
| JP | 11275782 | | 10/1999 |
| JP | 2000041349 A | * | 2/2000 |
| JP | 2000083354 A | * | 3/2000 |
| JP | 2000270504 A | * | 9/2000 |
| JP | 2002233101 | | 8/2002 |
| KR | P1996-033073 | | 8/1996 |

OTHER PUBLICATIONS

Dickert, "Development of High Bandwidth Torque Sensor for Control of High Performance Manipulators," Jan. 2, 1999, Thesis. Internet publication.*

English Translation of Korean Patent Office Action in corresponding application.

* cited by examiner

SLIM SPINDLE MOTOR AND MICRO-DRIVE APPARATUS COMPRISING THE SAME

BACKGROUND OF THE INVENTION

This application claims the priority of Korean Patent Application No. 2002-70063, filed on Nov. 12, 2002, in the Korean Intellectual Property Office, the disclosure of which is incorporated herein in its entirety by reference.

1. Field of the Invention

The present invention relates to a spindle motor and a micro-drive apparatus including the spindle motor, and more particularly, to a spindle motor having a slim stator improved for use in mobile micro-drive apparatuses and a slim micro-drive apparatus comprising the slim spindle motor.

2. Description of the Related Art

Figure 1:
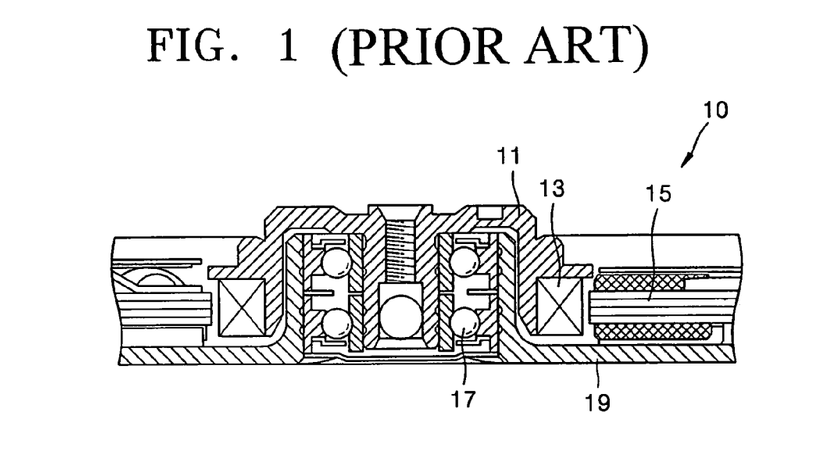
FIG. 1 is a side cross-section of a spindle motor in a conventional IBM micro-drive apparatus.

FIG. 1 is a side cross-section of a spindle motor 10 in a conventional IBM micro-drive apparatus. Referring to FIG. 1, the conventional spindle motor 10 includes a hub 11, a magnet 13, and yokes 15. The hub 11 has ball bearings 17 in the space defined by the hub 11 and is rotatably supported by a base plate 19. The magnet 13 is fastened to the hub 11 to provide a magnetic force. The yokes 15 are arranged around the outer boundary of the magnet 13 and wound with coils and generate turning forces to the spindle motor 10 by interaction between current flowing in the coils and the magnetic force of the magnet 13. The yokes 15 are fixedly installed at the base plate 19.

Currently, most current mobile micro-drive apparatuses have a CompactFlash type I (CF-I) form, which is an existing flash memory standard and provides a thickness of 3.3 mm, and their application range is gradually extending. On the other hand, the conventional IBM micro-drive apparatus of FIG. 1 is excellent in terms of capacity, unit cost per storage capacity, and future competitiveness but adopts a CF-II form which provides a thickness of 5.0 mm because of the difficulties of making slim. As shown in FIG. 1, the conventional CF-II IBM micro-drive apparatus has the spindle motor 10 in which the magnet 13 and the yokes 15 are arranged to have the same central axis, thereby maximizing the rotation efficiency of the spindle motor 10. However, such an arrangement is not suitable for the CF-I form having a great demand. In particular, there is not enough space in which to install stator yokes because of the thickness of an actuator installed in the space where the stator yokes are to be located.

SUMMARY OF THE INVENTION

The present invention provides a slim spindle motor having an improved stator and a slim micro-drive apparatus using the slim spindle motor.

According to an aspect of the present invention, there is provided a spindle motor including: a hub seating a disk thereon and rotatably mounted on a base plate by ball bearings; a ring-shaped magnet engaged to the outer boundary of the hub; and a stator formed by arranging a plurality of yokes in a round shape around the outer boundary of the ring-shaped magnet. The yokes include cores having ends curved to reduce the central axis offset between each of the yokes and the ring-shaped magnet and most of the yokes include coils that cover the cores.

The curved ends are curved either upward or downward so as to be perpendicular to the central axis of the stator.

According to an aspect of the present invention, there is also provided a spindle motor including: a hub seating a disk thereon and rotatably mounted on a base plate by ball bearings; a ring-shaped magnet engaged to the outer boundary of the hub and having an increased diameter; and a stator formed by arranging a plurality of yokes in a round shape around the outer boundary of the ring-shaped magnet. The yokes include cores with increased diameters arranged such as to reduce the central axis offset between each of the yokes and the ring-shaped magnet and most of the yokes include coils that cover the cores.

According to an aspect of the present invention, there is also provided a spindle motor including: a hub seating a disk thereon and rotatably mounted on a base plate by ball bearings; a slim ring-shaped magnet engaged to the outer boundary of the hub; and a stator formed by arranging a plurality of slim yokes in a round shape around the outer boundary of the ring-shaped magnet. The slim yokes include cores arranged such as to reduce the central axis offset between each of the yokes and the ring-shaped magnet and most of the yokes include coils that cover the cores.

According to another aspect of the present invention, there is provided a micro-drive apparatus including a base plate, a spindle motor, and an actuator. The spindle motor includes a hub seating a disk thereon and rotatably mounted on a base plate by ball bearings, a ring-shaped magnet engaged to the outer boundary of the hub, and a stator formed by arranging a plurality of yokes in a round shape around the outer boundary of the ring-shaped magnet. The yokes include cores having curved ends to reduce the central axis offset between the yokes and the ring-shaped magnet and most of the yokes include coils that cover the cores. The actuator includes a head, which moves over the disk to write/read data to/from the disk, and a suspension positioned at an end of the head.

According to another aspect of the present invention, there is also provided another micro-drive apparatus including a base plate, a spindle motor, and an actuator. The spindle motor includes a hub seating a disk thereon and rotatably mounted on a base plate by ball bearings, a ring-shaped magnet engaged to the outer boundary of the hub and having an increased diameter, and a stator formed by arranging a plurality of yokes in a round shape around the outer boundary of the ring-shaped magnet. The yokes include cores with increased diameters arranged such as to reduce the central axis offset between the yokes and the ring-shaped magnet and most of the yokes include coils that cover the cores. The actuator includes a head, which moves over the disk to write/read data to/from the disk, and a suspension positioned at an end of the head.

According to another aspect of the present invention, there is also provided still another micro-drive apparatus including a base plate, a spindle motor, and an actuator. The spindle motor includes a hub seating a disk thereon and rotatably mounted on a base plate by ball bearings, a slim ring-shaped magnet engaged to the outer boundary of the hub, and a stator formed by arranging a plurality of slim yokes in a round shape around the outer boundary of the ring-shaped magnet. The slim yokes include cores arranged such as to reduce the central axis offset between the yokes and the ring-shaped magnet and most of the yokes include coils that cover the cores. The actuator includes a head, which moves over the disk to write/read data to/from the disk, and a suspension positioned at an end of the head.

The curved ends are curved either upward or downward so as to be perpendicular to the central axis of the stator.

Preferably, the magnet has a thickness of 1 mm or less.

Preferably, the cores have thicknesses of 0.5 mm or less.

Preferably, the number of cores is less than the number of poles of the magnet.

The micro-drive apparatus further includes a damper installed on the hub to firmly clamp the disk to the hub and a screw locked in the hub to fix the clamper to the hub.

Due to the use of the improved stator according to the present invention in which a central axis offset between the magnets and the yokes is reduced, a spindle motor is slimmed, and a micro-drive apparatus using the spindle motor are also be slimmed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 2:
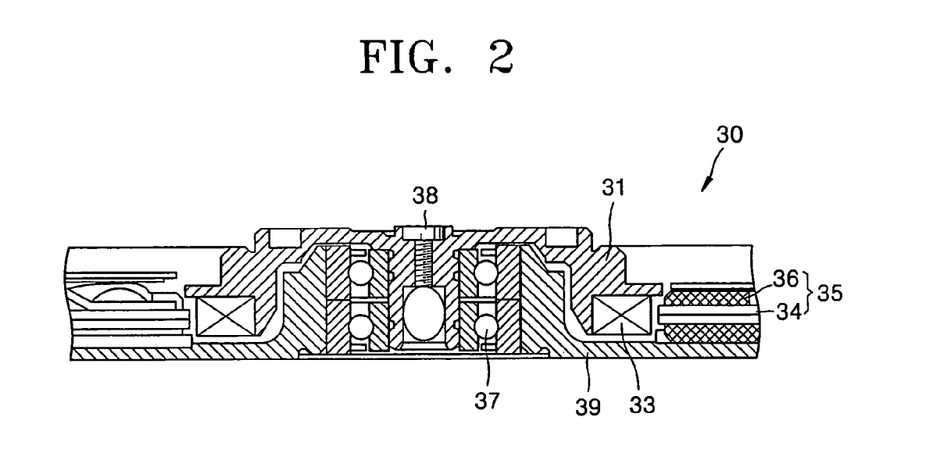
FIG. 2 is a side cross-section of a slim spindle motor according to an embodiment of the present invention.

Referring to FIG. 2, a slim spindle motor 30 according to an embodiment of the present invention includes a hub 31, a ring-shaped magnet 33, and yokes 35. The hub 31 is rotatably fixed to a base plate 39 by ball bearings 37. The circular magnet 33 is fastened to the outer boundary of the hub 31 to provide a magnetic force. The yokes 35 are arranged in a round shape along the outer boundary of the magnet 33.

The magnet 33 functions as a rotor, and the yokes 35 function as a stator. The yokes 35 are wound with coils and generate electromagnetic forces that interact with the magnetic force of the magnet 33 so as to rotate the spindle motor 30 in a predetermined direction, which depends on the direction of current received from a flexible printed circuit (FPC, not shown). A screw 38 is locked in the central axis of the hub 31 to fix a damper (not shown), which seat a disk and fix the seated disk.

The spindle motor 30 according to an embodiment of the present invention includes the circular magnet 33 smaller than the magnet 13 of the conventional spindle motor 10 of FIG. 1 and the yokes 35 installed along the outer boundary of the magnet 33, thereby simply achieving slimming of a micro-drive apparatus. The yokes 35 are fixed onto the base plate 39 and rotate the spindle motor 30 by rotating the hub 31 to which the magnet 33 is fastened using an electromagnetic force. Making the central axes of the magnet 33 and each of the yokes 35 collinear can maximize a torque created by the electromagnetic force generated by interaction between the magnetic field of the magnet 33 and the electric field created by current flowing in coils 34 wound around the yokes 35 and can remove a force in an unnecessary Z-axis direction, that is, in the direction of the height of a drive apparatus.

If an offset between the central axes of the magnet 33 and each of the yokes 35 occurs, a force in the Z-axis direction is generated, which causes unstable operation (e.g., vibration) of the spindle motor 30. If the spindle motor 30 operates unstably, a seated disk (not shown) does not rotate in a round shape but in a distorted round shape. Hence, a head may be positioned on a wrong track, which is referred to as runout. If such runout occurs, it is difficult to record data to an accurate area on a disk, and recorded data cannot be properly read.

Hence, the spindle motor 30 of FIG. 2 includes a first embodiment of a stator whose central axes offset is removed, though the magnet 33 and the yoke 35 become slimmer. However, since there is a limit in slimming the magnet 33 and the reduction of the thickness of the magnet 33 reduces the amount of generated magnetic force, the magnet 33 having a high magnetic flux must be employed. To overcome this limit, first and second embodiments of a stator that can have the magnet 33 whose thickness is not slimmed are shown in FIGS. 3A and 4.

Figure 3A:
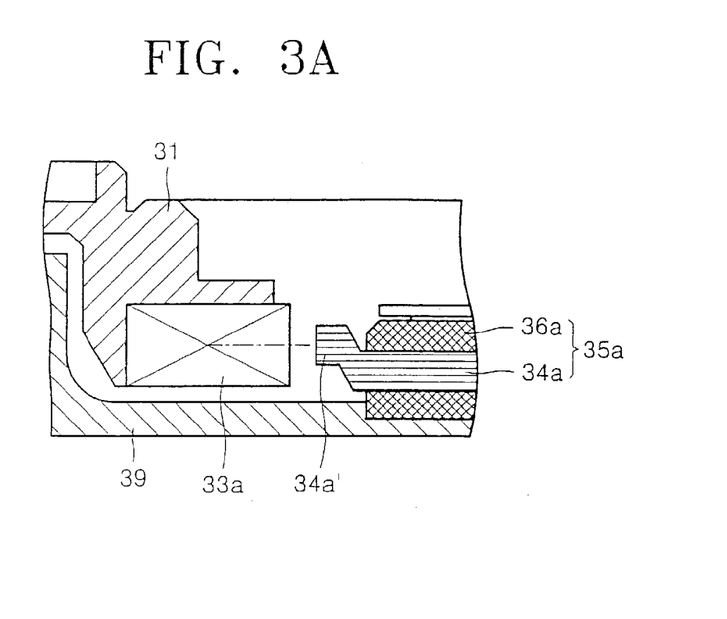
FIG. 3A is a cross-section of a first embodiment of a stator that can be installed in the slim spindle motor of FIG. 2.
Figure 3B:
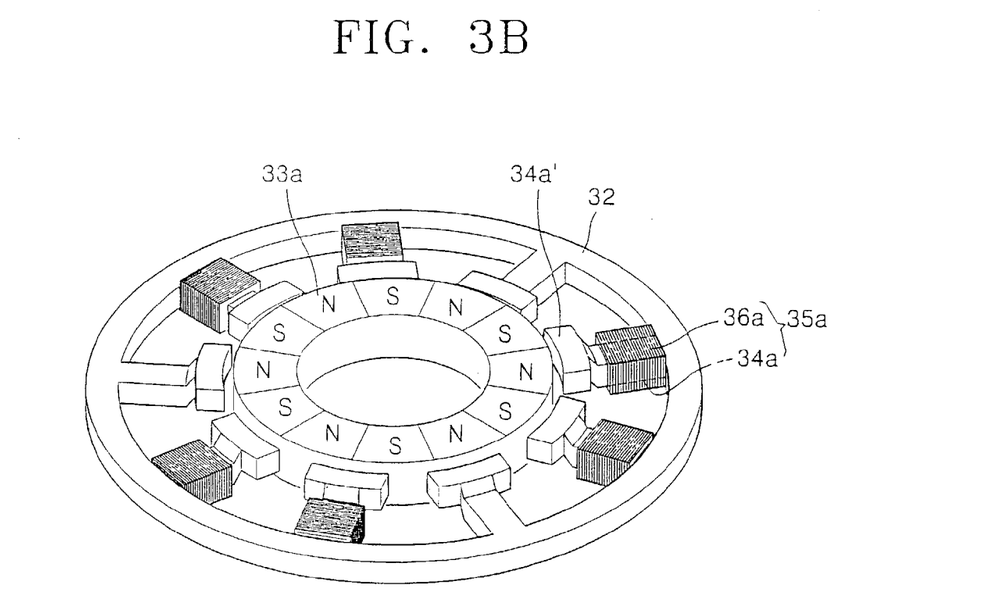
FIG. 3B is a perspective view of the stator of FIG. 3A.
Figure 4:
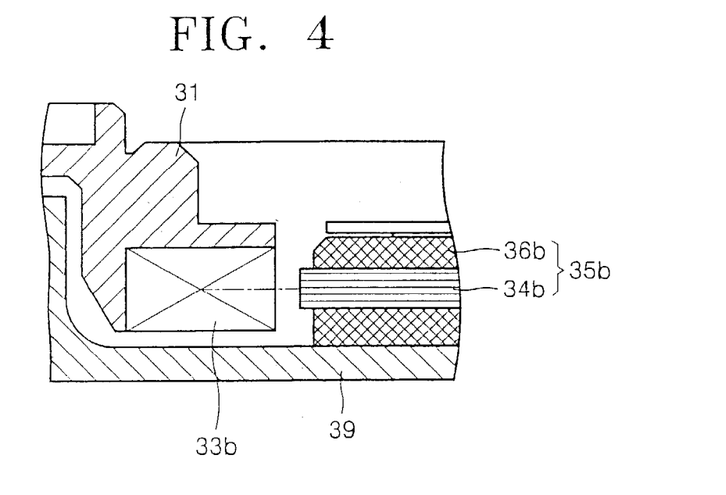
FIG. 4 is a cross-section of a second embodiment of a stator that can be installed in the slim spindle motor of FIG. 2.

FIGS. 3A and 4 show first and second embodiments of a stator that can be installed in the slim spindle motor of FIG. 2. FIG. 3B is a perspective view of the stator of FIG. 3A.

In the first embodiment of the stator of FIGS. 3A and 3B, yokes 35a have ends 34a curved upwardly such that the central axes of the yokes 35a are collinear with that of a magnet 33a and are arranged around the outer boundary of the magnet 33a. The yokes 35a are each comprised of a core 34a and a coil 36a which covers the core 34a. The magnet 33a is engaged to the hub 31, and the yokes 35a are fixed onto the base plate 39. If the magnet 33a is installed at a location lower than the yokes 35a, the yokes 35a may have downwardly curved ends instead of the upwardly curved ends 34a so as to make the central axis of each of the cores 34a collinear with that of the magnet 33a.

Referring to FIG. 3B, the ring-shaped magnet 33a is comprised of 12 poles, and 9 yokes 35a are arranged in a round shape around the outer boundary of the magnet 33a. A stator 32 is comprised of the yokes 35a symmetrically arranged around the outer boundary of the magnet 33a land an outer ring which supports the yokes 35a. As described above, the yokes 35a are each comprised of the core 34a and the coil 36a wound around the core 34a.

In the second embodiment of the stator of FIG. 4, the hub 31 is installed at a high location and the diameter of the magnet 33b is increased, thereby obtaining sufficient outer space. The yokes 35b are positioned in the obtained space at a higher location than the location where the yokes 35a in the first embodiment are positioned, such that the central axis of each of the yokes 35b is made collinear with that of the magnet 33b. However, since the stator according to the second embodiment needs a space in which to install the yokes 35b, the locations of other component elements must be adjusted.

Hence, a spindle motor adopting the stator according to the first embodiment shown in FIGS. 3A and 3B is suitable for use in conventional CF-I disk drives.

Figure 5:
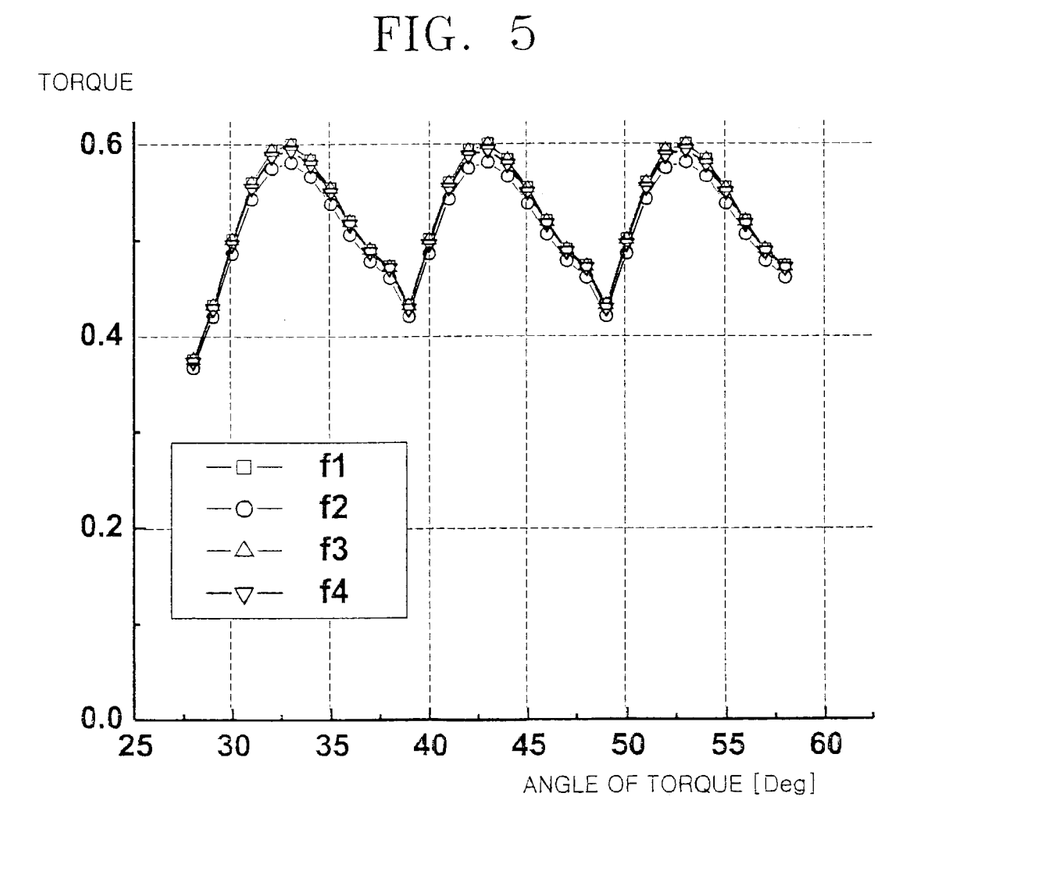
FIG. 5 is a graph showing variations in the torque of a slim spindle motor according to an embodiment of the present invention with respect to the angle of the torque.

FIG. 5 is a graph showing variations in the torque of a slim spindle motor according to an embodiment of the present invention with respect to the angle of the torque. Reference numeral f1 indicates an ideal case where an offset is 0, reference numeral f2 indicates a case where an offset is 0.2 mm, reference numeral f3 indicates a case where an offset has been removed by curving an end of a yoke upward by 0.2 mm, and reference numeral f4 indicates a case where an offset is reduced from 0.12 mm to 0.08 mm by curving the end of the yoke upward by 0.2 mm.

Referring to FIG. 5, cases f1, f3, and f4 have similar torque variations, while the torque of case f2 is reduced from those of the other three cases. Such a reduction in torque denotes a reduction in the turning force of a spindle motor, and then if the turning force is reduced, the spindle motor operates unstably. Unstable operation of the spindle motor causes a disk seated on the spindle motor to rotate irregularly, making it difficult to accurately write data to an area on the disk and accurately read data. Thus, a spindle motor according to the present invention can have a stable torque characteristic by adopting a structure in which an offset between the central axes of a magnet and a yoke is reduced or removed.

Figure 6:
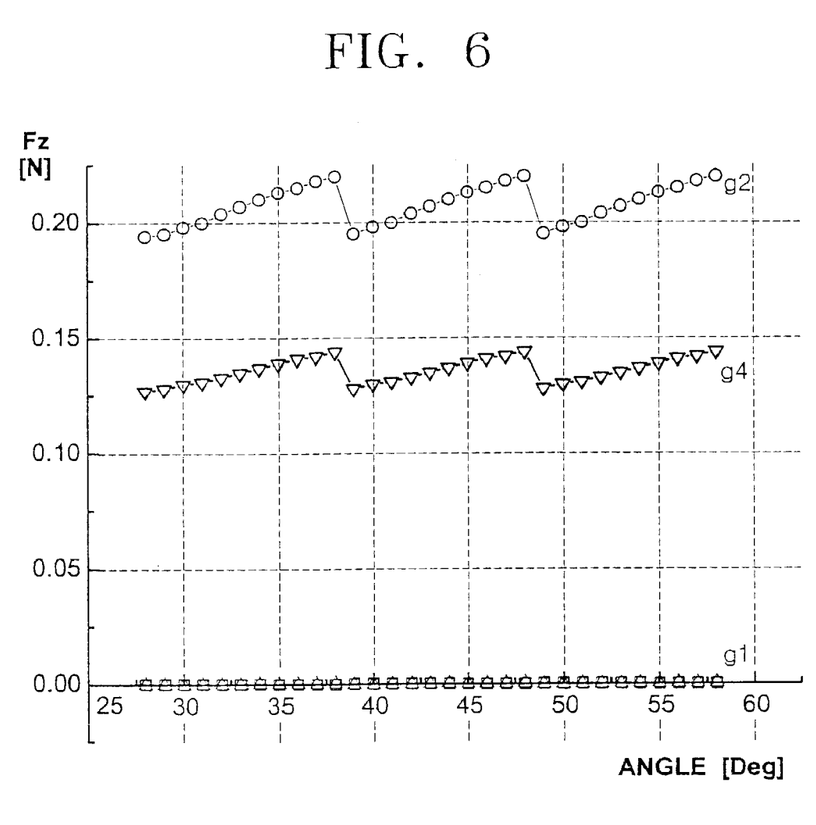
FIG. 6 is a graph showing variations in an axial electromagnetic force with respect to its angle.

FIG. 6 is a graph showing variations in an axial electromagnetic force with respect to its angle. Referring to FIG. 6, reference numeral g1 indicates a force in a Z-axial direction, Fz, that represents 0 in an ideal case where an offset is zero. Reference numeral g2 indicates Fz of about 0.2 N in the case f2 of FIG. 4, and reference numeral g4 indicates Fz of about 0.14 N in the case f4 of FIG. 4. As shown in FIG. 6, a Z-axial offset generates the Z-axial force (Fz), and Fz increases as the Z-axial offset increases. As described above, as Fz increases, the rotation of the spindle motor becomes unstable.

Figure 7:
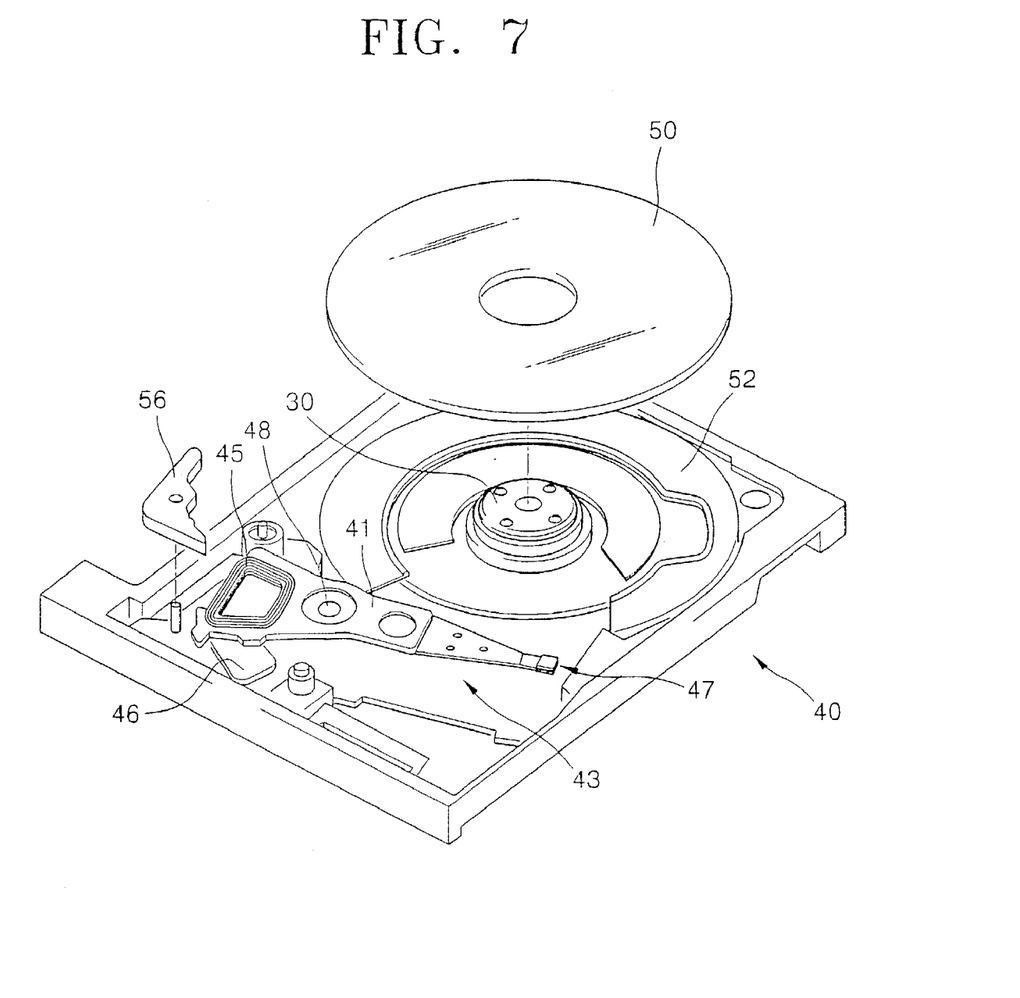
FIG. 7 is an exploded perspective view of a disk drive apparatus in which the slim spindle motor of FIG. 2 is installed.

FIG. 7 is an exploded perspective view of a disk drive apparatus 40 in which the slim spindle motor of FIG. 2 is installed. The disk drive apparatus 40 includes a disk 50 which stores information, a locking area 52 on which the disk 50 is seated, the spindle motor 30 which rotates the seated disk 50, an actuator 43 having a head 47 capable of recording/reproducing data to/from the disk 50, and a voice coil motor (not shown) comprised of a magnet assembly 46 and a voice coil 45 which drives the actuator 43.

The spindle motor 30 of FIG. 2 is positioned under the locking area 52. A stator installed in the spindle motor 30 can be any of the stators shown in FIGS. 2 through 4. Preferably, an offset is removed by making the central axis of the magnet 33, 33a, or 33b collinear with that of the yoke 35, 35a, or 35b, respectively, so that a force in the Z-axial direction is removed.

The actuator 43 receives an electrical signal from a printed circuit board (PCB; not shown) via a flexible printed circuit (FPC; not shown).

The disk 50 is comprised of a parking zone minutely formed by laser at the inner area of the disk 50 and is fitted onto the spindle motor 30 so that the head 47 can be parked in the parking zone upon power-off. A data zone can be formed at the outside of the parking zone to record a magnetic signal on the data zone. The data zone has several tens of thousands of tracks on which a servo signal indicating locations where data is to be recorded has already been recorded along the circular shape of the disk 50.

The actuator 43 includes the voice coil motor (not shown) which drives the actuator 43, a pivot bearing 48 around which the actuator 43 rotates, and the head 47 which has a write head to write data to the disk 50 and a read head to read data from the disk 50. In particular, the actuator 43 is made very slim by attaching the voice coil 45 to a fantail molding portion, which is formed by extending a uni-mounting portion of a head gimbal assembly 41.

The PCB sends an electrical signal to the FPC, and the FPC transmits the received electrical signal to the actuator 43. The electrical signal received by the actuator 43 is transmitted to the voice coil 45. An electromagnetic force created by interaction between current flowing in the voice coil 45 and the magnetic force of the magnet assembly 46 rotates, the actuator 43 around the pivot bearing 48 to move the actuator 43 from the parking zone to the data zone.

The present invention provides a stator whose central axes offsets between the magnet and yokes are reduced or removed, thereby obtaining a slim spindle motor and a slim micro-drive apparatus.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, various stators in which the central axes of yokes are collinear with that of a magnet may be construed.

As described above, the use of a stator in which the central axes of yokes are collinear with that of a magnet makes it possible to manufacture a slimmer and lighter spindle motor and a slimmer and lighter micro-drive apparatus that can maintain a stable driving performance and also be utilized as a mobile micro-drive apparatus.

What is claimed is:

1. A spindle motor comprising:
   a hub for seating a disk thereon and rotatably mounted on a base plate by ball bearings;
   a ring-shaped magnet affixed to the outer peripheral surface of the hub; and
   a stator formed by radially arranging a plurality of yokes around the outer peripheral surface of the ring-shaped magnet, wherein the yokes include cores having ends curved to reduce the central axis offset between each of the yokes and the-ring-shaped magnet and wherein the central axes of tip portions of the curved ends of the cores are substantially perpendicular to the central axis of the stator and wherein yokes include coils wound around the cores.

2. The spindle motor of claim 1, wherein the magnet has a thickness of 1 mm or less.

3. The spindle motor of claim 1, wherein the cores have thicknesses of 5 mm or less.

4. The spindle motor of claim 1, wherein the number of cores is less than the number of poles of the magnet.

5. The spindle motor of claim 1, further comprising:
   a damper installed on the hub to firmly clamp the disk to the hub; and
   a screw locked in the hub to fix the damper to the hub.

6. A micro-drive apparatus comprising:
   a base plate;
   a spindle motor including a hub for seating a disk thereon and rotatably mounted on the base plate by ball bearings, a ring-shaped magnet affixed to the outer peripheral surface of the hub, and a stator formed by radially arranging a plurality of yokes around the outer peripheral surface of the ring-shaped magnet, wherein the yokes include cores having curved ends to reduce the central axis offset between the yokes and the ring-shaped magnet and wherein the central axes of tip portions of the curved ends of the cores are substantially perpendicular to the central axis of the stator and wherein yokes include coils wound around the cores; and
   an actuator including a head, which moves over the disk to write/read data to/from the disk, and a suspension positioned at an end of the head.

7. The micro-drive apparatus of claim 6, wherein the magnet has a thickness of 1 mm or less.

8. The micro-drive apparatus of claim 6, wherein the cores have thicknesses of 0.5 mm or less.

9. The micro-drive apparatus of claim 6, wherein the number of cores is less than the number of poles of the magnet.

10. The micro-drive apparatus of claim 6, further comprising:
 a damper installed on the hub to firmly clamp the disk to the hub; and
 a screw locked in the hub to fix the damper to the hub.

* * * * *